US012586973B2

(12) United States Patent
Yamashita et al.

(10) Patent No.:  US 12,586,973 B2
(45) Date of Patent:  Mar. 24, 2026

(54) RARE EARTH DOPED FIBER AND FIBER OPTIC AMPLIFIER

(71) Applicant: NIPPON TELEGRAPH AND TELEPHONE CORPORATION, Tokyo (JP)

(72) Inventors: Yoko Yamashita, Tokyo (JP); Kazuhide Nakajima, Tokyo (JP); Takashi Matsui, Tokyo (JP)

(73) Assignee: NTT, Inc., Tokyo (JP)

( * ) Notice: Subject to any disclaimer, the term of this patent is extended or adjusted under 35 U.S.C. 154(b) by 888 days.

(21) Appl. No.: 17/791,930

(22) PCT Filed: Feb. 19, 2020

(86) PCT No.: PCT/JP2020/006460
§ 371 (c)(1),
(2) Date: Jul. 11, 2022

(87) PCT Pub. No.: WO2021/166107
PCT Pub. Date: Aug. 26, 2021

(65) Prior Publication Data
US 2023/0042437 A1      Feb. 9, 2023

(51) Int. Cl.
*H01S 3/00* (2006.01)
*H01S 3/067* (2006.01)
*H01S 3/094* (2006.01)
*H01S 3/16* (2006.01)

(52) U.S. Cl.
CPC .... *H01S 3/06716* (2013.01); *H01S 3/094003* (2013.01); *H01S 3/1603* (2013.01)

(58) Field of Classification Search
CPC .......................... H01S 3/094003; H01S 3/1603
See application file for complete search history.

(56) References Cited

U.S. PATENT DOCUMENTS

2015/0043879 A1* 2/2015 Minelly ............... G02B 6/0283
                                                                65/386
2015/0117474 A1 4/2015 Jiang et al.
(Continued)

FOREIGN PATENT DOCUMENTS

CN        105842779 A  *  8/2016  ............... G02B 6/02
CN        104808288 B  *  2/2018  ......... G02B 6/02328
JP        2016-167489 A      9/2016
(Continued)

OTHER PUBLICATIONS

M. Wada et al., "Modal Gain Controllable 2-LP-Mode Fiber Amplifier Using PLC Type Coupler and Long-Period Grating", JLT, vol. 32, No. 24, pp. 4694-4700, 2014.
(Continued)

*Primary Examiner* — Mark Hellner
(74) *Attorney, Agent, or Firm* — Harness, Dickey & Pierce, P.L.C.

(57) ABSTRACT

An object of the present disclosure is to allow gain compensation with a simple configuration without adding a new device to the outside. The present disclosure discloses a rare earth doped fiber including a core doped with a rare earth and a cladding region around the core, wherein one or more cavities are provided inside the core, and at least one of the cavities are provided along a longitudinal direction of the rare earth doped fiber.

6 Claims, 9 Drawing Sheets

(56) References Cited

U.S. PATENT DOCUMENTS

2019/0052043 A1*  2/2019  Jollivet .................... G02B 6/14
2021/0234326 A1    7/2021  Yamashita et al.

FOREIGN PATENT DOCUMENTS

| | | | |
|---|---|---|---|
| JP | 2017-501428 | A | 1/2017 |
| JP | 2017-157757 | A | 9/2017 |
| JP | 2019-508892 | A | 3/2019 |
| WO | WO-2020/032016 | A1 | 2/2020 |

OTHER PUBLICATIONS

M. Wada et al., "L-band 2-LP mode EDFA with low modal dependent gain", OFC 2015, Tu3C. 3,2015.
E. Ip et al., "Experimental characterization of a ring-profile few-mode Erbium-doped fiber amplifier enabling gain equalization", OFC 2013, JTh2A. 18, 2013.

* cited by examiner

[1]

14

82

81

83-5

83-4

83-3

83

83-2

83-1

DISTANCE FROM CENTER OF CORE (μm)

ECCENTRICITY OF CAVITY (μm)

RARE EARTH DOPED FIBER AND FIBER OPTIC AMPLIFIER

CROSS-REFERENCE TO RELATED APPLICATIONS

This application is a 371 U.S. National Phase of International Application No. PCT/JP2020/006460, filed on Feb. 19, 2020. The entire disclosure of the above application is incorporated herein by reference.

TECHNICAL FIELD

The present disclosure relates to a rare earth doped fiber and an optical fiber amplifier that amplify signal light having a plurality of modes in a mode-multiplexed repeating transmission line.

BACKGROUND ART

For mode-multiplexed repeating transmission, a gain difference between modes in an optical fiber amplifier is a significant issue. Proposed techniques to compensate for this include a technique for converting a mode of pumping light into a higher order mode and a technique for optimally designing refractive index distribution and a rare earth doped region (see, for example, NPLs 1 to 3).

Unfortunately, the former requires a new device for the mode conversion, causing deterioration of amplification characteristics due to an excessive loss and an increase in size, and the latter requires complicated design and production, causing deterioration of a yield and an increase in production cost.

CITATION LIST

Non Patent Literature

NPL 1: M. Wada et al., "Modal Gain Controllable 2-LP-Mode Fiber Amplifier Using PLC Type Coupler and Long-Period Grating," JLT, vol. 32, no. 24, pp. 4694-4700, 2014.
NPL 2: M. Wada et al., "L-band 2-LP mode EDFA with low modal dependent gain," OFC 2015, Tu3C. 3, 2015.
NPL 3: E. Ip et al., "Experimental characterization of a ring-profile few-mode Erbium-doped fiber amplifier enabling gain equalization," OFC 2013, JTh2A. 18, 2013.

SUMMARY OF THE INVENTION

Technical Problem

According to this, an object of the present disclosure is to allow gain compensation with a simple configuration without adding a new device to the outside.

Means for Solving the Problem

To achieve the above object, the present disclosure sets a cavity region inside a core of a rare earth doped fiber to reduce a gain deviation between modes. A difference in loss occurring in the cavity region depending on the modes generates the gain deviation between the modes. Therefore, the present disclosure enables gain compensation with a simple configuration without adding a new device to the outside.

To be more specific, a rare earth doped fiber according to the present disclosure includes a core doped with a rare earth and a cladding region around the core, wherein one or more cavities are provided inside the core, and at least one of the cavities are provided along a longitudinal direction of the rare earth doped fiber.

To be more specific, an optical fiber amplifier according to the present disclosure includes the rare earth doped fiber according to the present disclosure, a pump light inlet section that allows pump light, for amplifying signal light in the rare earth doped fiber, to exit therefrom, and a light coupling section that couples the pump light from the pump light inlet section with the signal light and that injects light obtained by coupling the pump light and the signal light into the rare earth doped fiber.

Effects of the Invention

According to the present disclosure, gain compensation can be enabled with a simple configuration without adding a new device to the outside.

BRIEF DESCRIPTION OF DRAWINGS

FIG. 5 illustrates an example of losses in an $LP_{01}$ mode and an $LP_{11}$ mode when $\Delta_1$ and $a_1$ are changed.
FIG. 6 illustrates an example of a relationship between a loss difference between modes $\Delta_{Loss}$ and $a_2/a_1$.
FIG. 9 illustrates an example of a relationship between $a_2/a_1$ and $x/a_1$ where the loss difference between modes $\Delta_{Loss}$ is equal to or less than 0 dB.

DESCRIPTION OF EMBODIMENTS

Hereinafter, embodiments of the present disclosure will be described in detail with reference to the drawings. Note that the present disclosure is not limited to the embodiments that will be described below. These embodiments are just illustrative examples, and the present disclosure can be implemented in forms in which various modifications and improvements are added on the basis of knowledge of those skilled in the art. Note that constituent elements with the same reference signs in the specification and the drawings are assumed to be the same constituent elements.

First Embodiment

Figure 1:
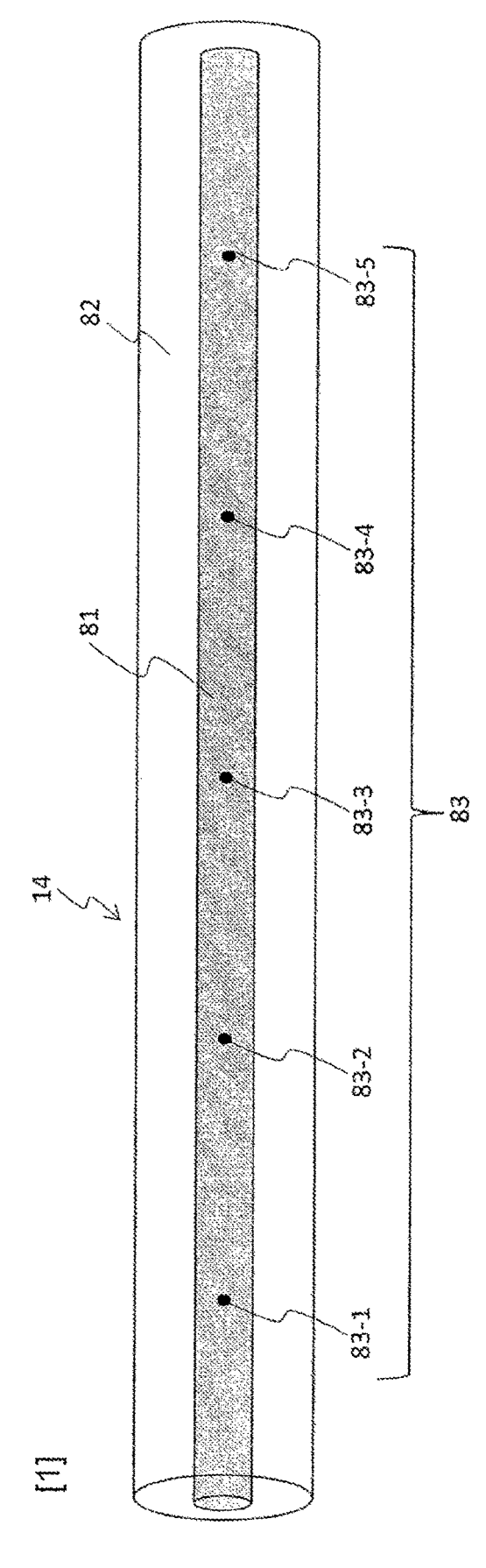
FIG. 1 illustrates an example of a side view of a rare earth doped fiber according to the present disclosure.
Figure 2:
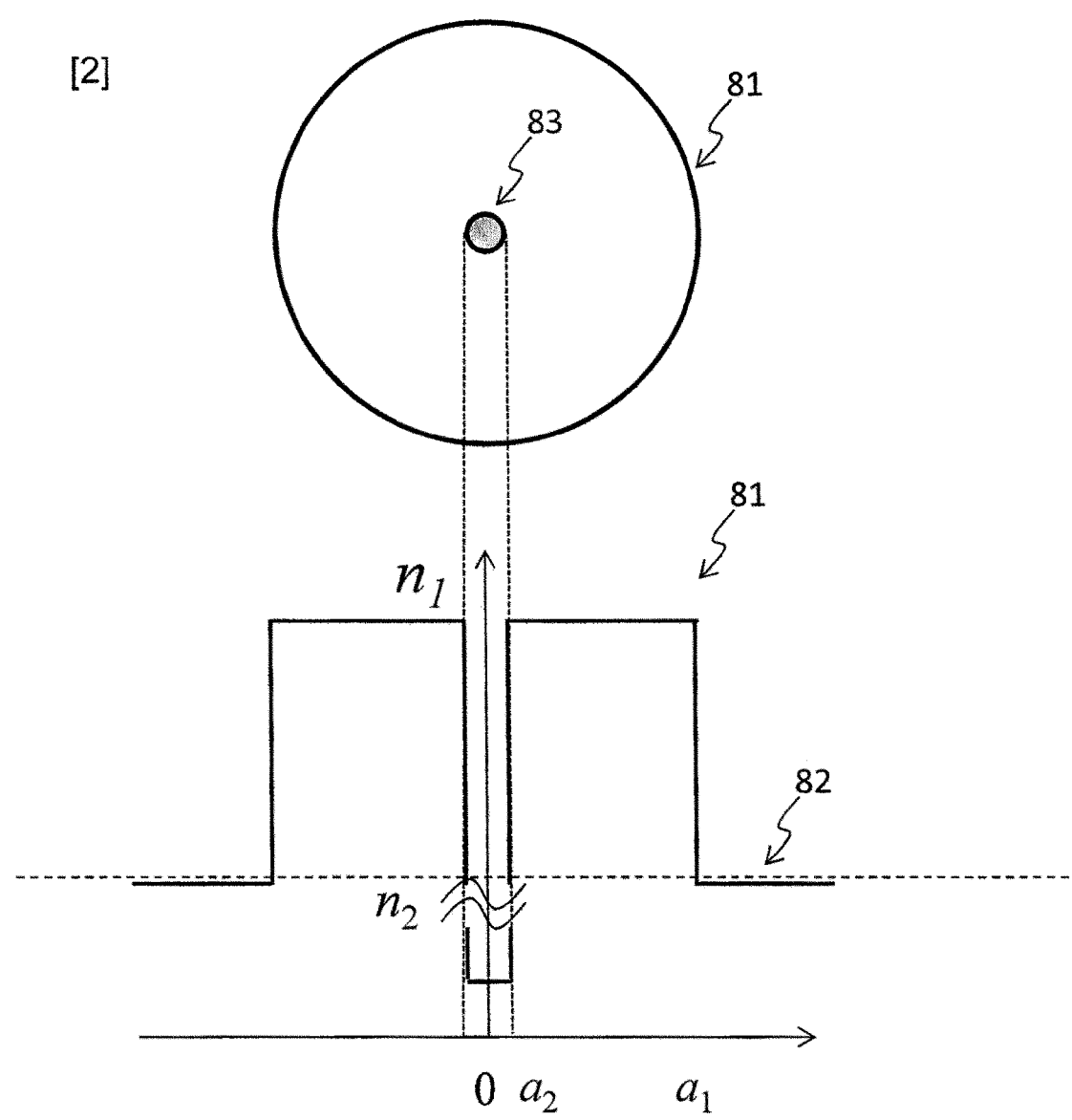
FIG. 2 illustrates an example of a cross-sectional view of a rare earth doped fiber according to the present disclosure.

FIG. 1 and FIG. 2 illustrate a side view and a cross-sectional view of a rare earth doped fiber according to the present disclosure. A rare earth doped fiber 14 according to the present disclosure includes one or more cavities 83, each having a spherical shape, provided in an intermittent manner along a longitudinal direction as illustrated in FIG. 1. Here, a radius of a core 81, a radius of each of the cavities 83, a refractive index of the core 81, and a refractive index of a cladding region 82 are defined as $a_1$, $a_2$, $n_1$, and $n_2$, respectively. Also, relative index difference $\Delta_1$ of the core 81 is defined as below.

$$\Delta_1 = (n_1{}^2 - n_2{}^2)/2n_1{}^2 \qquad \text{[Math. 1]}$$

Also, although the embodiment will be described in which a 2-LP mode is adopted, a case where the number of modes increases can be considered as well.

In general, a gain of the rare earth doped fiber 14 with the 2-LP mode when a fundamental mode is used for pump light is higher in the fundamental mode having a large overlap with the pump light. Because this gain difference between the modes is directly connected to a mode dependent loss of an overall system, the transmission characteristics of the overall system are degraded.

In the present technique, by forming the cavities 83 having a spherical shape at a center portion of the rare earth doped fiber 14, a loss is applied to an $LP_{01}$ mode of the fundamental mode but no loss is applied to an $LP_{11}$ mode, at an end face, so a loss is applied only to the fundamental mode, and thus, the gain between the modes can be flattened. For example, a femtosecond laser is used to form the cavities 83 from the end faces or the side face of the fiber, and thus, the cavities 83 can be provided at the center of the core 81.

Figure 3:
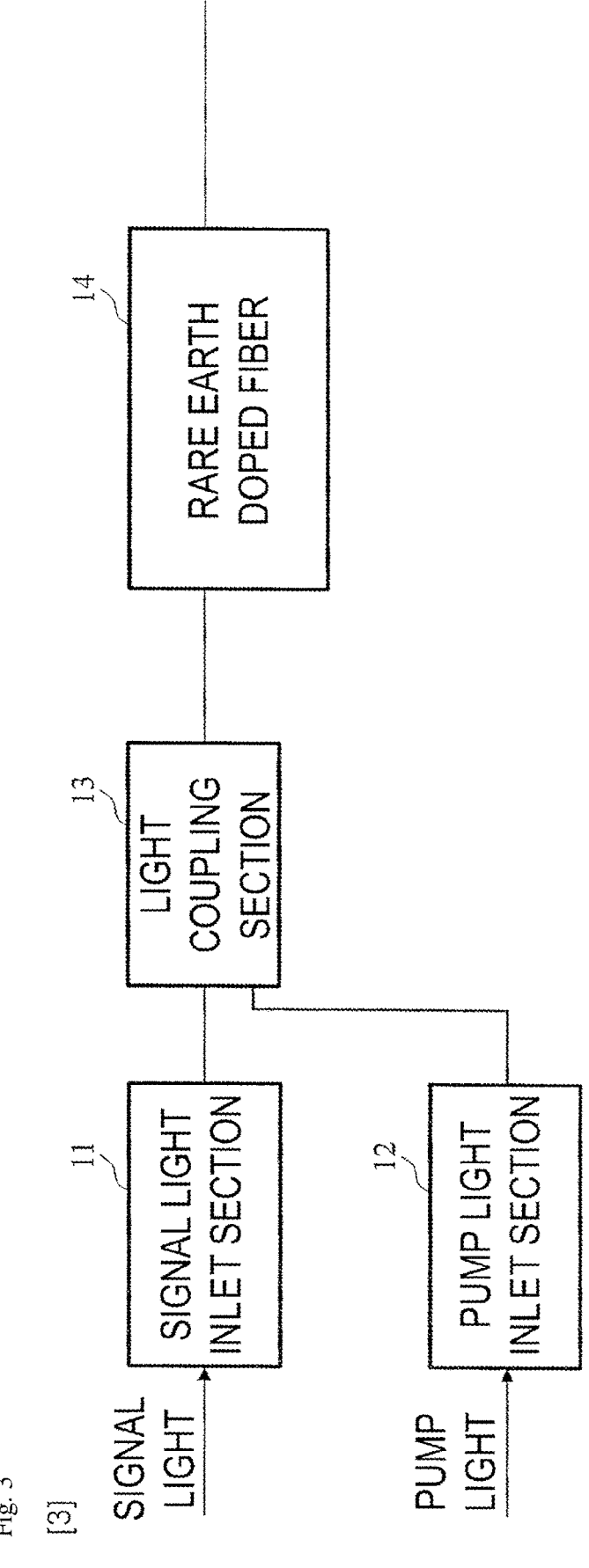
FIG. 3 illustrates an example of a system configuration of an optical fiber amplifier.

FIG. 3 is a system configuration diagram of an optical fiber amplifier. The optical fiber amplifier includes a signal inlet section 11, a pump light inlet section 12, a light coupling section 13, and the rare earth doped fiber 14. Signal light enters the signal inlet section 11. Pump light for amplifying signal light in the rare earth doped fiber 14 enters the pump light inlet section 12. The light coupling section 13 couples the pump light from the pump light inlet section 12 with the signal light from the signal inlet section 11. Light obtained by coupling the signal light and pump light in the light coupling section 13 is injected into the rare earth doped fiber 14.

Note that although FIG. 3 illustrates an example of injecting pump light in one direction of the rare earth doped fiber 14, the present technique is also effective for a bi-directional pumping optical fiber amplifier where pump light is injected in both directions of the rare earth doped fiber 14.

Additionally, when the cavities 83 are provided at a previous portion of the rare earth doped fiber 14, signal light suffers a loss by the cavities 83 before the signal light is amplified, and the deterioration of the signal light and the deterioration of a noise figure (NF) occur, so it is desirable to have each of the cavities 83 provided at a middle portion or a subsequent portion thereof in the longitudinal direction of the rare earth doped fiber 14.

In addition, in FIG. 1, an example is illustrated with five cavities 83 denoted by 83-1 to 83-5, but the effect of the present disclosure can be obtained by providing at least one cavity of the cavities 83-1 to 83-5. Radii of the cavities 83-1 to 83-5 may be freely selected.

Second Embodiment

Figure 4:
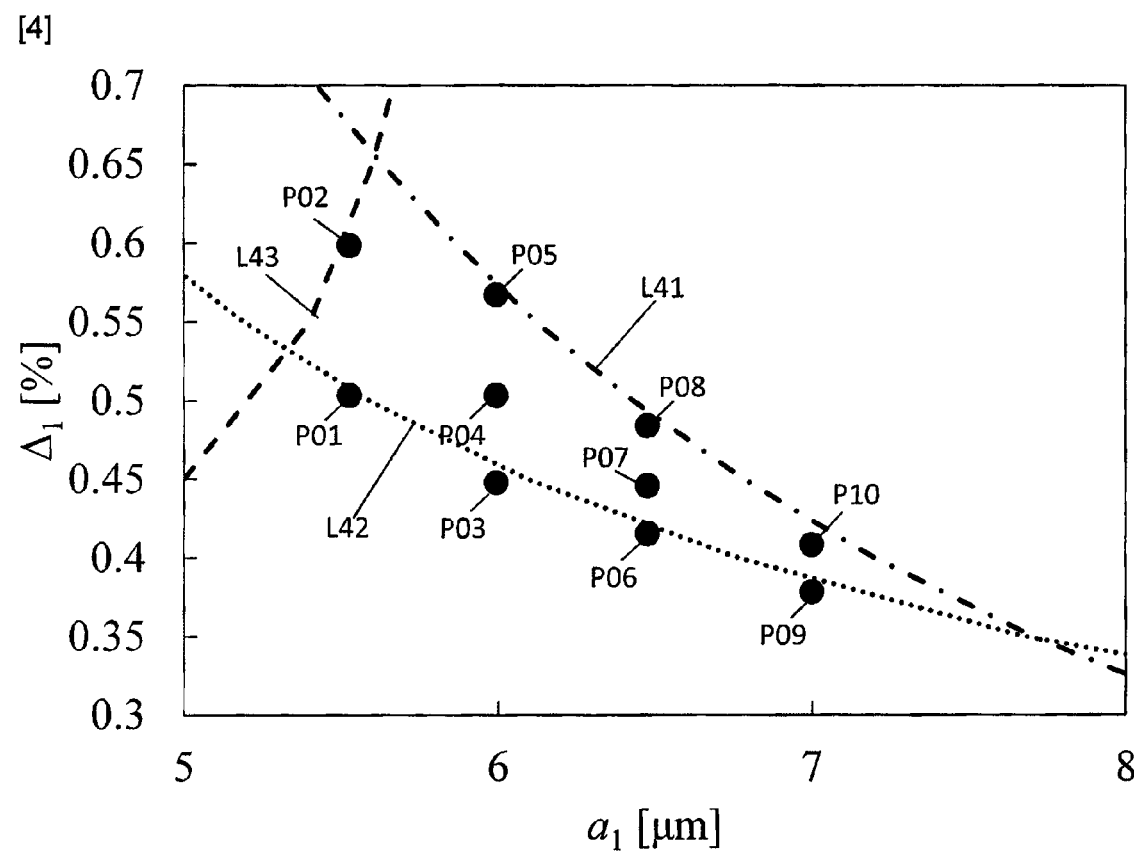
FIG. 4 illustrates an example of a region having a core radius and relative index difference of the core that allow 2-LP mode transmission in the C-band.

In assuming the use in the C-band (with a wavelength of 1530 nm to 1565 nm), FIG. 4 illustrates an example of a region having the core radius $a_1$ and the relative index difference $\Delta_1$ of the core 81 that allow the 2-LP mode transmission in the C-band. A line L41 in the figure indicates a theoretical boundary that can cut off light of an $LP_{21}$ mode with a wavelength of 1530 nm. A line L42 indicates a boundary where a bending loss of light of the $LP_{11}$ mode with a wavelength of 1565 nm is equal to or less than 0.5 dB/100 turn when a bending radius R is 30 mm A line L43 indicates a boundary where an effective core cross-sectional area $A_{\textit{eff}}$ in the $LP_{01}$ mode is 80 μm. The 2-LP mode transmission is allowed in the region enclosed by the lines L41, L42, and L43.

Figure 5:
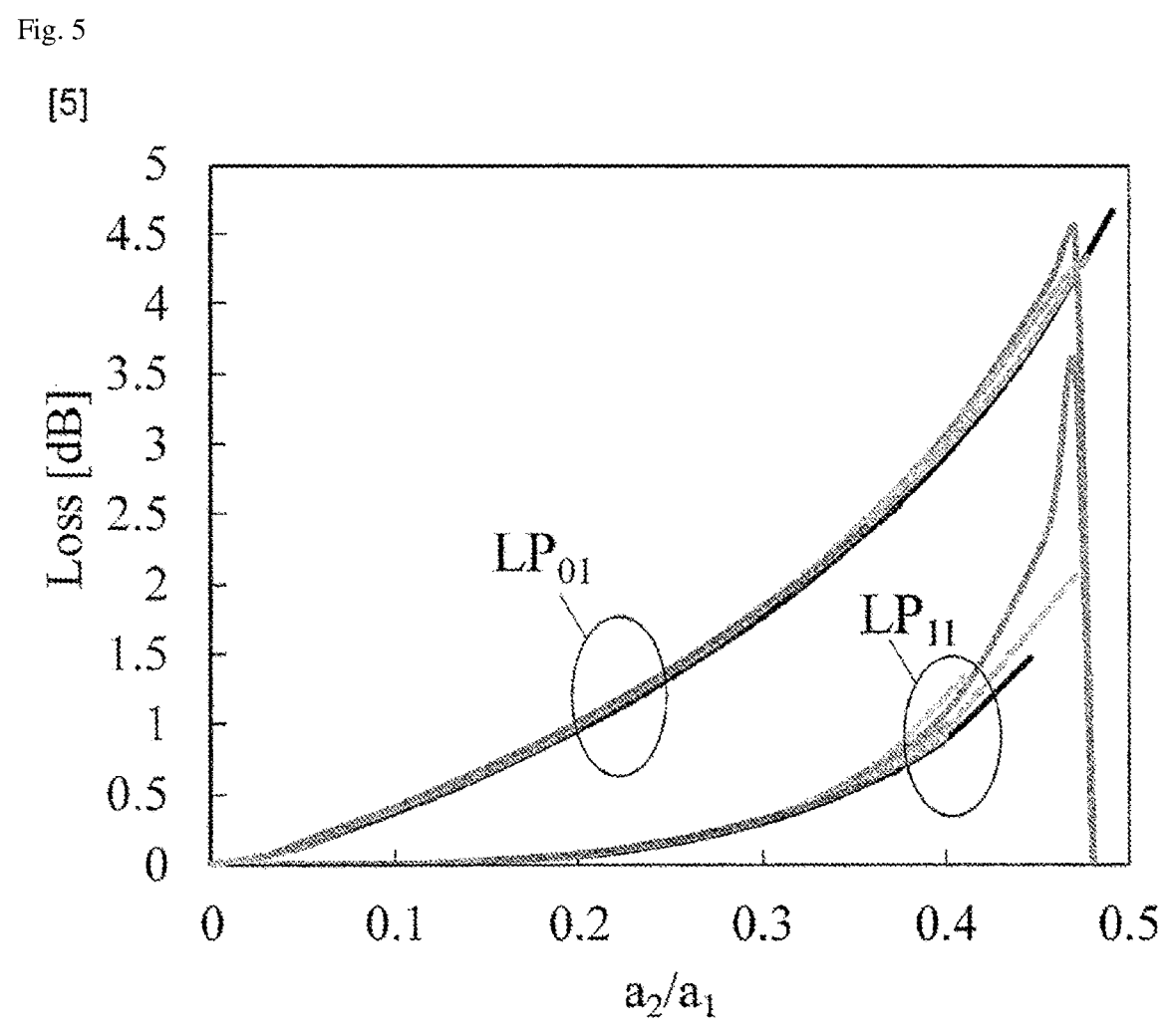

FIG. 5 illustrates an example of $a_2/a_1$ and losses in the $LP_{01}$ mode and the $LP_{11}$ mode at P01 to P10 in the range in FIG. 4. P01 indicates $\Delta_1 = 0.51\%$ and $a_1 = 5.5$ μm, P02 indicates $\Delta_1 = 0.60\%$ and $a_1 = 5.5$ μm, P03 indicates $\Delta_1 = 0.45\%$ and $a_1 = 6.0$ μm, P04 indicates $\Delta_1 = 0.51\%$ and $a_1 = 6.0$ μm, P05 indicates $\Delta_1 = 0.57\%$ and $a_1 = 6.0$ μm, P06 indicates $\Delta_1 = 0.41\%$ and $a_1 = 6.5$ μm, P07 indicates $\Delta_1 = 0.45\%$ and $a_1 = 6.5$ μm, P08 indicates $\Delta_1 = 0.48\%$ and $a_1 = 6.5$ μm, P09 indicates $\Delta_1 = 0.38\%$ and $a_1 = 7.0$ μm, and P10 indicates $\Delta_1 = 0.48\%$ and $a_1 = 7.0$ μm. It can be seen from the figure that the dependency of the loss in each of the propagation modes on $a_1$ and $\Delta_1$ is small under the conditions capable of the 2-LP mode transmission. Thus, hereinafter, calculation is performed by representatively using the structure with $\Delta_1 = 0.45\%$ and $a_1 = 6$ μm.

Figure 6:
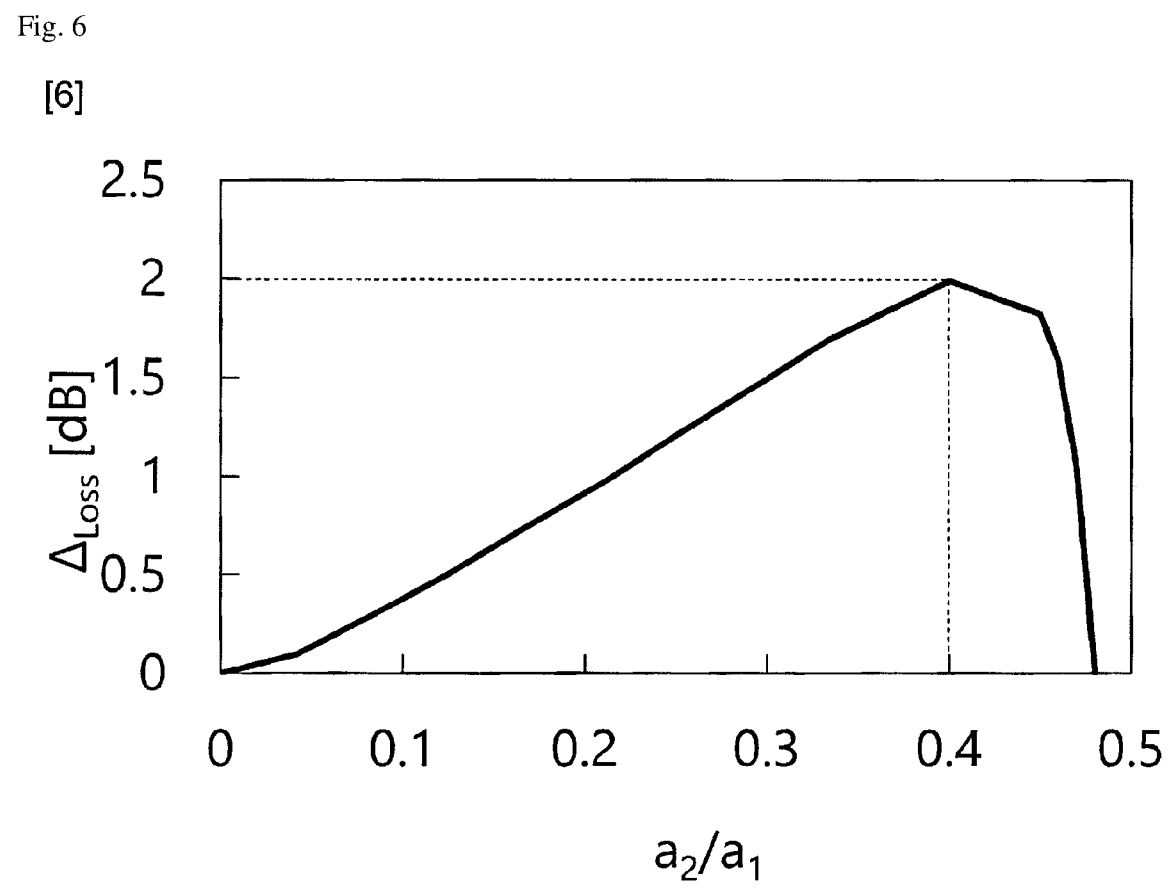

FIG. 6 illustrates an example of a relationship between a loss difference between modes $\Delta_{Loss}$ of the $LP_{01}$ mode and the $LP_{11}$ mode and $a_2/a_1$. The loss difference between modes $\Delta_{Loss}$ is a difference between the loss in the $LP_{01}$ mode and the loss in the $LP_{11}$ mode ($LP_{01}$–$LP_{11}$). It can be seen that changing $a_2/a_1$ can control the loss difference between modes $\Delta_{Loss}$. As illustrated in FIG. 5, because the dependency of the loss in each propagation mode on $a_1$ is small, the loss in the $LP_{01}$ mode can be larger than the loss in the $LP_{11}$ mode by increasing a radius $a_2$ of each of the cavities 83.

Note that, within a range where $a_2/a_1$ is larger than or equal to 0.48, the loss in each propagation mode becomes excessive due to the radius $a_2$ of each of the cavities 83 becoming too large, and the control properties of the loss difference between modes $\Delta_{Loss}$ are significantly reduced. For this reason, $a_2/a_1$ is preferably set to the condition being equal to or less than 0.4.

In addition, the maximum value of the loss difference between modes $\Delta_{Loss}$ of one of the cavities 83 is 2 dB. Thus, when it is necessary to make the loss difference between modes $\Delta_{Loss}$ equal to or larger than 2 dB, by providing the plurality of cavities 83 in the longitudinal direction, the loss difference between modes $\Delta_{Loss}$ can be increased in proportion to the number of the cavities 83. For example, the rare earth doped fiber 14 includes the cavities 83-1 and 83-2 as illustrated in FIG. 1, the $a_2/a_1$ of the cavity 83-1 is set to 0.4, and the $a_2/a_1$ of the cavity 83-2 is set to 0.2, allowing the loss difference between modes $\Delta_{Loss}$ to be 3 dB.

Third Embodiment

Figure 7:
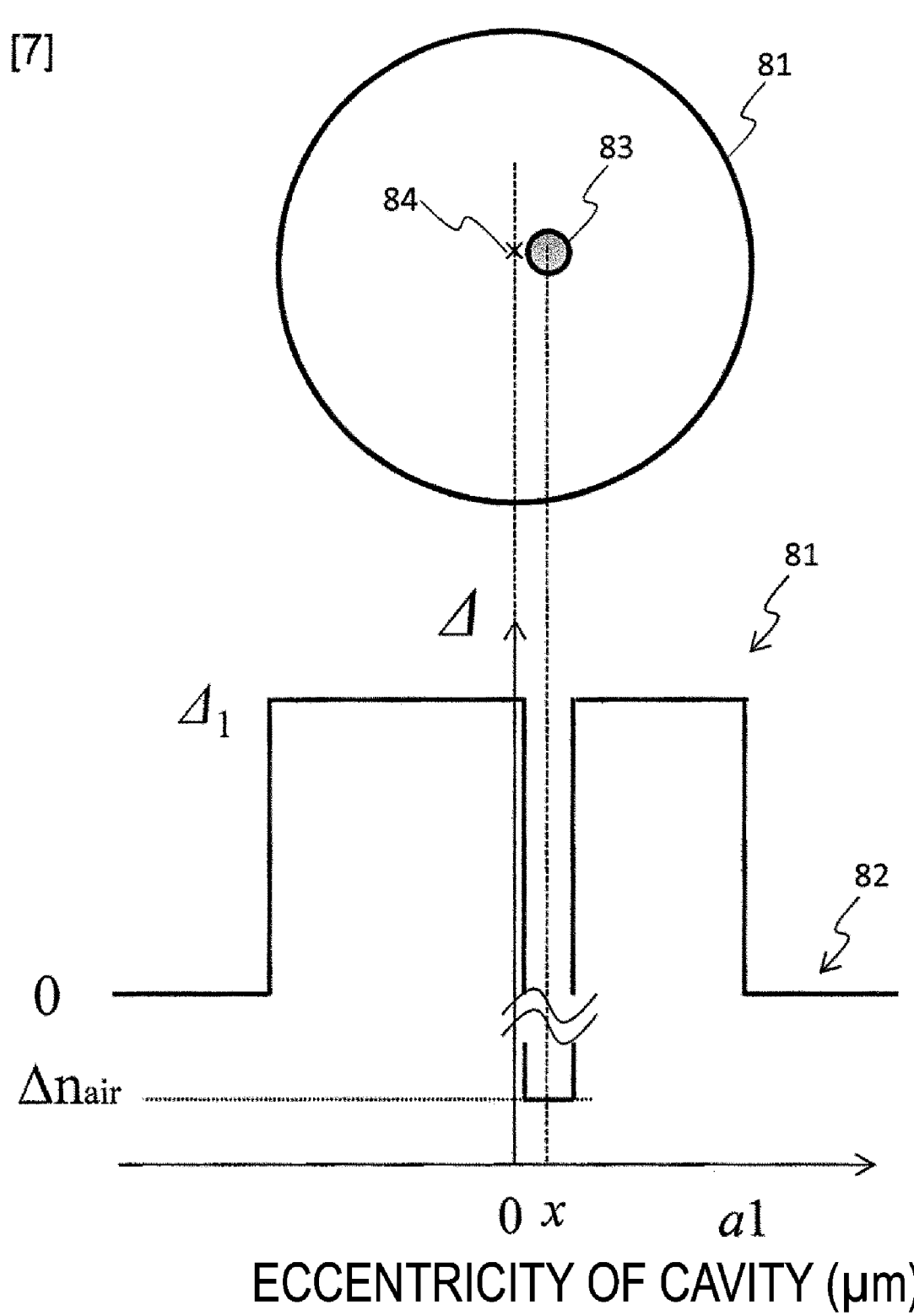
FIG. 7 illustrates the definition of eccentricity x of a cavity.

In order to reduce the excessive loss in $LP_{11}$ mode and to control the loss difference between modes, each of the cavities 83 is desirably at the center of the rare earth doped fiber 14. Thus, eccentricity of a center of one of the cavities 83 with respect to a center 84 of a core 11 will be considered. In FIG. 7, a definition of eccentricity x of one of the cavities 83 is illustrated. The eccentricity x is a distance from the center 84 of the core 11 to the center of that of the cavities 83. As the eccentricity x of the center of that of the cavities 83 increases, that of the cavities 83 overlays a region where an electric field is strong in the $LP_{11}$ mode, and thus, the loss in the $LP_{11}$ mode is significantly increased and becomes larger than the loss in the $LP_{01}$ mode.

Figure 8:
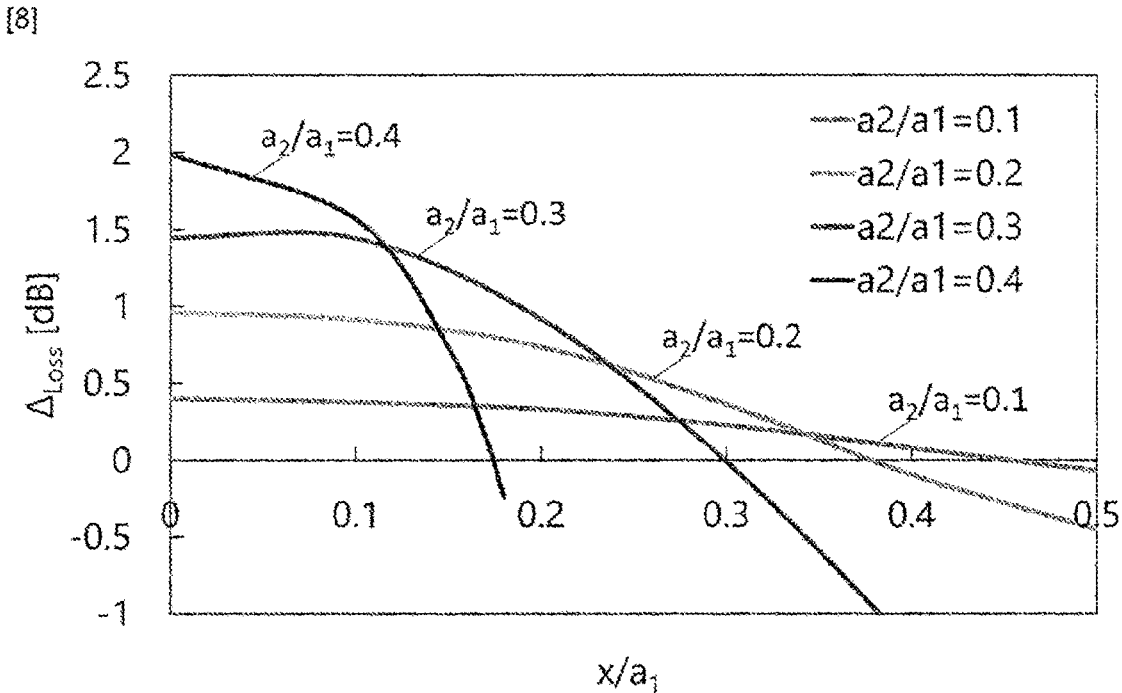
FIG. 8 illustrates an example of a relationship between $\Delta_{Loss}$ and $x/a_1$.

FIG. 8 illustrates an example of a relationship between $\Delta_{Loss}$ and $x/a_1$ in each of the cases of $a_2/a_1 = 0.1, 0.2, 0.3$, and 0.4. In the same way as the above, calculation is performed under the conditions of $a_1 = 6$ μm and $\Delta_1 = 0.45\%$, and the loss difference between modes $\Delta_{Loss}$ of the $LP_{01}$ mode and the $LP_{11}$ mode is determined. Here, for the loss in the $LP_{11}$ mode, an average loss of four modes including degeneracy and polarization is used. For each $a_2/a_1$, the loss difference between modes $\Delta_{Loss}$ is negative in a region where $x/a_1$ is larger than or equal to a certain value, and a loss cannot be applied to the $LP_{01}$ mode. As points each of which has $\Delta_{Loss}$ is equal to or less than 0 dB, attention is focused on $(a_2/a_1, x/a_1) = (0.1, 0.46), (0.2, 0.38), (0.3, 0.3),$ and $(0.4, 0.18)$.

FIG. 9 illustrates an example of a relationship between $a_2/a_1$ and $x/a_1$ where the loss difference between modes $\Delta_{Loss}$ is equal to or less than 0 dB. It can be seen from FIG. 9 that a boundary where the loss difference between modes $\Delta_{Loss}$ is equal to or less than 0 dB can be approximated by the following relational equation.

[Math. 2]

$$x/a_1 = -0.92 a_2/a_1 + 0.6 \qquad (2)$$

Thus, $a_2/a_1$ and $x/a_1$ are preferably set within the filled-in area in FIG. 9 that is below the equation (2).

Note that the present technique does not depend on refractive index distribution and rare earth dopant distribution and can be applied to complex refractive index distribution and rare earth dopant distribution, such as step or ring types.

Furthermore, similar effects can be obtained by using rare earth doped fibers 14 doped with different types of rare earths such as erbium, thulium, ytterbium, praseodymium, and neodymium in accordance with the wavelength of signal light.

Effects of the Present Disclosure

Setting the cavity region inside the rare earth doped fiber 14 by external processing using a femtosecond laser without inserting a new device allows the gain deviation between modes to be optionally reduced without degrading the NF properties.

Gain compensation can be performed with a simple configuration having only the rare earth doped fiber, and performing the compensation at the center inside the optical fiber amplifier can suppress both the deterioration of the gain and the deterioration of the NF, thus achieving the gain compensation with low loss and low NF.

Point of the Present Disclosure By creating cavities at the center in a longitudinal direction of a fiber, gain deviation compensation between modes with low loss and low NF can be achieved.

INDUSTRIAL APPLICABILITY

The present disclosure can be applied in the information communication industry.

REFERENCE SIGNS LIST

11 Signal inlet section
12 Pump light inlet section
13 Light coupling section
14 Rare earth doped fiber
81 Core
82 Cladding region
83 Cavity

The invention claimed is:

1. A rare earth doped fiber comprising:
   a core doped with a rare earth; and
   a cladding region around the core, wherein
   one or more cavities are provided inside the core, and
   at least one of the cavities is provided along a longitudinal direction of the rare earth doped fiber and the at least one of the cavities has a radius configured to reduces loss difference between modes used in a mode multiplexing.

2. The rare earth doped fiber according to claim 1, wherein
   a ratio $a_2/a_1$ of a radius $a_2$ of the cavity or each of the cavities to a radius $a_1$ of the core is equal to or smaller than 0.4.

3. The rare earth doped fiber according to claim 1, wherein
   A ratio $x/a_1$ of eccentricity x of the cavity or each of the cavities from a center of the core to a radius $a_1$ of the core satisfies an equation (C1)

$$x/a_1 = -0.92 a_2/a_1 + 0.6 \qquad (C1)$$

where $a_2$ is a radius of the cavity or a radius corresponding to each of the cavities.

4. The rare earth doped fiber according to claim 1, wherein
   the cavity or each of the cavities is provided at a middle portion or a subsequent portion thereof in the longitudinal direction of the rare earth doped fiber.

5. The rare earth doped fiber according to claim 1, wherein
   the rare earth is any one of erbium, thulium, ytterbium, praseodymium, or neodymium.

6. An optical fiber amplifier comprising:
   the rare earth doped fiber according to claim 1;
   a pump light inlet section configured to allow pump light, for amplifying signal light in the rare earth doped fiber, to exit therefrom; and
   a light coupling section configured to couple the pump light from the pump light inlet section with the signal light and to inject light obtained by coupling the pump light and the signal light into the rare earth doped fiber.

* * * * *